(12) United States Patent (10) Patent No.: US 7,792,992 B2
Gnanasambandam et al. (45) Date of Patent: Sep. 7, 2010

(54) SERVERLESS DISTRIBUTED MONITORING AND ANOMALY DETECTION FOR A SERVICE ORIENTED ARCHITECTURE

(75) Inventors: Shanmuganathan Gnanasambandam, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 177 days.

(21) Appl. No.: 12/129,195

(22) Filed: May 29, 2008

(65) Prior Publication Data

US 2009/0300215 A1 Dec. 3, 2009

(51) Int. Cl.
*G06F 15/173* (2006.01)
(52) U.S. Cl. ............... 709/242; 709/243; 709/230; 709/225; 709/227
(58) Field of Classification Search ............. 709/242, 709/243, 230, 225, 224, 244, 227; 725/46
See application file for complete search history.

(56) References Cited

U.S. PATENT DOCUMENTS

| 6,415,323 | B1* | 7/2002 | McCanne et al. | 709/225 |
|---|---|---|---|---|
| 2004/0054807 | A1* | 3/2004 | Harvey et al. | 709/243 |
| 2004/0143666 | A1* | 7/2004 | Xu et al. | 709/227 |
| 2005/0183120 | A1* | 8/2005 | Jain et al. | 725/46 |
| 2006/0265508 | A1* | 11/2006 | Angel et al. | 709/230 |

OTHER PUBLICATIONS

E. Kiciman and Y.-M. Wang, "Discovering correctness constraints for self-management of system configuration," in *Proceedings of the First International Conference on Autonomic Computing*, New York, NY, May 2004, pp. 28-35.

M. Chen, A.X. Zheng, J. Lloyd, M.I. Jordan, and E. Brewer, "Failure diagnosis using decision trees," in *Proceedings of the First International Conference on Autonomic Computing*, New York, NY, May 2004, pp. 36-37.

G. Jiang, H. Chen, C. Ungureanu, and K. Yoshihira, "Multi-resolution abnormal trace detection using varied-length n-grams and automata," in *Proceedings of the 2nd International Conference on Autonomic Computing*, Seattle, WA, Jun. 2005, pp. 111-122.

G. Jiang, H. Chen, and K. Yoshihira, "Discovering likely invariants of distributed transaction systems for autonomic system management," *Cluster Computing*, vol. 9, No. 4, pp. 385-399, 2006.

(Continued)

*Primary Examiner*—Tonia L. Dollinger
*Assistant Examiner*—Kyung H Shin
(74) *Attorney, Agent, or Firm*—Fay Sharpe LLP (57) ABSTRACT

A system and method for serverless distributed monitoring anomaly detection for a service oriented architecture is provided. The method includes selecting a number of nodes, e.g. super peers, to form an overlay network which is configured to facilitate bidirectional information flow creating a peer-to-peer monitoring framework through replication chains. The method continues with mapping the overlay network to data by assigning each of the selected nodes to a data region related to its surroundings. The method continues with distributing the data regions among the nodes via the aforementioned replication chain, where each replication chain is sensitive to the type of application that requests data duplication in monitoring the data by collecting information from each of those nodes that correspond to an assigned or distributed data region. This method may also include taking corrective action if the node detects an anomaly.

20 Claims, 4 Drawing Sheets

OTHER PUBLICATIONS

M. Ester, H.-P. Kriegel, J. Sander, and X. Xu, "A density-based algorithm for discovering clusters in large spatial databases with noise," in *Proceedings of the 2nd International Conference on Knowledge Discovery and Data Mining (KDD-96)*, 1996.

R. Agrawal, J. Gehrke, D. Gunopulos, and P. Raghavan, "Automatic sub-space clustering of high dimensional data for data mining applications," in *Proceedings of 1998 ACM-SIGMOD Int. Conf. Management of Data*, Seattle, Washington, Jun. 1998, pp. 94-105.

I. Stoica, R. Morris, D. Karger, M.F. Kaashoek, and H. Balakrishnan, "Chord: A scalable peer-to-peer lookup service for internet applications," in *Proceedings of ACM SIGCOMM*, San Diego, CA, Aug. 2001, pp. 149-160.

N. Jiang, C. Schmidt, V. Matossian, and M. Parashar, "Enabling applications in sensor-based pervasive environments," in *Basenets 2004*, San Jose, CA, Oct. 2004.

S. Bandyopadhyah, C. Gianella, U. Maulik, H. Kargupta, K. Liu, and S. Datta, "Clustering distributed data streams in peer-to-peer environments," *Information Sciences*, vol. 176, No. 14, pp. 1952-1985, Jul. 2006.

M. Li, W.-C. Lee, and A. Sivasubramaniam, "Pens: An Algorithm for density-based clustering in peer-to-peer systems," in *Proceedings of the International Conference on Scalable Information Systems (INFOS-CALE)*, Jun. 2006.

E. Ogston, B. Overinder, M. van Steen, and F. Brazier, "A method for decentralized clustering in large multi-agent systems," in *Proceedings of the 2nd International Joint Conference on Autonomous Agent and Multi-Agent Systems*, 2003, pp. 798-796.

O. Babaoglu, G. Canright, A. Deutsch, G.A.D. Caro, F. Ducatelle, L.M. Gambardella, N. Ganguly, M. Jelasity, R. Montemanni, A. Montressor and T. Urnes, "Design patterns from biology for distributed computing" ACM Transactions on Autonomous and Adaptive Systems, vol. 1, No. 1, pp. 26-66, Sep. 2006.

C. Schmidt and M. Parashar, "Flexible information discovery in descentralized distribution systems" in *12th IEEE International Symposium on High Performance Distributed Computing (HPDC-12'03)*, 2003.

B. Moon, H. Jagadish, and C. Faloutsos, "Analysis of the clustering properties of the Hilbert space-filling curve," *IEEE Transactions on Knowledge and Data Engineering*, vol. 13, No. 1, pp. 124-141, Jan./Feb. 2001.

A. Quiroz, M. Parashar, "Clustering Analysis for the Management of Self-monitoring Device Networks" *Proceedings of the 5th IEEE International Conference on Autonomic Computing (ICAC 2008)*, Chicago, USA, IEEE Computer Society Press, Jun. 2008.

* cited by examiner

SERVERLESS DISTRIBUTED MONITORING AND ANOMALY DETECTION FOR A SERVICE ORIENTED ARCHITECTURE

BACKGROUND

This disclosure relates to a method and apparatus for a service oriented architecture that monitors applications in a peer-to-peer fashion. More particularly, this disclosure relates to a method and apparatus for a serverless mechanism that can perform real time analysis and anomaly detection during the operation of software services on a MultiFunction Device (MFD) and/or other devices.

While this disclosure is particularly directed towards serverless distributed monitoring for multifunction devices and thus will be described with specific reference thereto, it will be appreciated that this disclosure may have usefulness in other fields and applications. For example, this disclosure may be useful in providing an architecture for analysis of a plurality of devices including Personal Digital Assistance (PDAs), mobile units, CPUs, etc.

By way of background, current Service Oriented Architectures (SOA) include multifunction device fleets that run several types of services. These services include printing, faxing, scanning, emailing, etc. Needless to say, these services are not without their problems. Sometimes there are anomalies in the system that require supervision in order to detect them. Currently in the art, there are a number of ways in order to detect and monitor these anomalies. One approach includes setting parameters, such as setting the number clusters that must be detected. Other approaches include monitoring the quality of service sensitive resources. However, these prior art approaches generally require a fair amount of human interaction. There is currently no hands-free serverless mechanism that detects anomalies automatically.

Therefore, there is a need in the art for a serverless decentralized overlay mechanism that monitors and detects anomalies in a SOA. It would be desirable for this architecture to combine sets of services that an MFD fleet can provide and internalize the resource needs (such as computing and memory) without mandating additional special purpose hardware tasked with monitoring the fleet. It would further be desirable for this architecture to utilize a variety of monitoring scenarios including fleet health, usage monitoring, and detection of malicious attacks, e.g. Denial of Service (DOS). Moreover, it would be desirable for the architecture to inherently address cost effectiveness and load balancing while spreading the workload among multiple available underutilized MFDs in the fleet. Furthermore, it would be desirable for this architecture to run virtually unsupervised using parameters inherent in the data.

The present disclosure contemplates a new and improved system and method which resolves the above-referenced difficulties and others.

SUMMARY OF THE DISCLOSURE

A method and apparatus for a serverless distributed monitoring and anomaly detection architecture is shown. The system and method will include a distributed density based clustering mechanism that requires very little user intervention, at least in part, because input required by the algorithm can be deduced from the data. The system and method also implements a cost effective serverless mechanism which operates as a distributed monitoring and anomaly detection service. The system operates in the network on the same nodes being used to process the data. This in turn eliminates the need for costly servers. Furthermore, the disclosed system and method implements robust monitoring. Robust monitoring includes data and code replication on a "per application" basis. In this instance the application may reliably monitor the multifunction device fleet, thereby providing quality platform support for making the monitoring application fail-safe.

In one aspect of the present disclosure, a method for implementing a decentralized serverless fail-safe monitoring application in a peer-to-peer manner includes selecting a number of nodes to form an overlay network configured to facilitate bi-directional information flow creating a peer-to-peer monitoring framework through replication chains, mapping the overlay network to data by assigning each of the selected nodes to a data region related to its surroundings and distributing the data regions among the selected nodes via the replication chains, where each replication chain is sensitive to the type of application that requires data duplication. The method also includes monitoring the data by collecting information from each of the nodes that corresponds to an assigned or distributed data region and taking corrective action if the node detects an anomaly.

In accordance with another aspect of the present disclosure, the method includes distributing the data regions utilizing a space filling curve configured to facilitate uniform distribution where the space filling curve is configured to fill an n-dimensional information space.

In accordance with another aspect of the present disclosure, a service oriented architecture for workload distribution mechanism comprises an information space divisible into at least one data region, a plurality of servers comprising a plurality of super peers configured to monitor information from the corresponding data regions and a replication chain configured to create a monitoring overlay framework that facilitates peer-to-peer bi-directional communication by distributing the information in at least one data region to at least one of the super peers. The architecture also includes an interface that is configured to communicate information collected by the super peers to an administrator.

In accordance with another aspect of the present disclosure, the system includes a replication module adapted to create multiple instances of data regions for distribution among the nodes. A distribution module adapted to distribute the data regions and a monitoring module configured to collect and analyze the data regions and identify anomalies in the node functionality. The system also includes an alarm configured to communicate the anomalies to an administrator and an overlay management system that is in communication with the replication module, distribution module, the monitoring module and the alarm that is configured to facilitate data replication on an application need basis.

DESCRIPTION OF THE DRAWINGS

The presently described embodiments and the construction, arrangement and combination of the various parts of the device and steps of the method whereby the object contemplated are attained as hereinafter more fully set forth, specifically pointing out in the claims and illustrated in the accompanied drawings in which:

DETAILED DESCRIPTION

Figure 1:
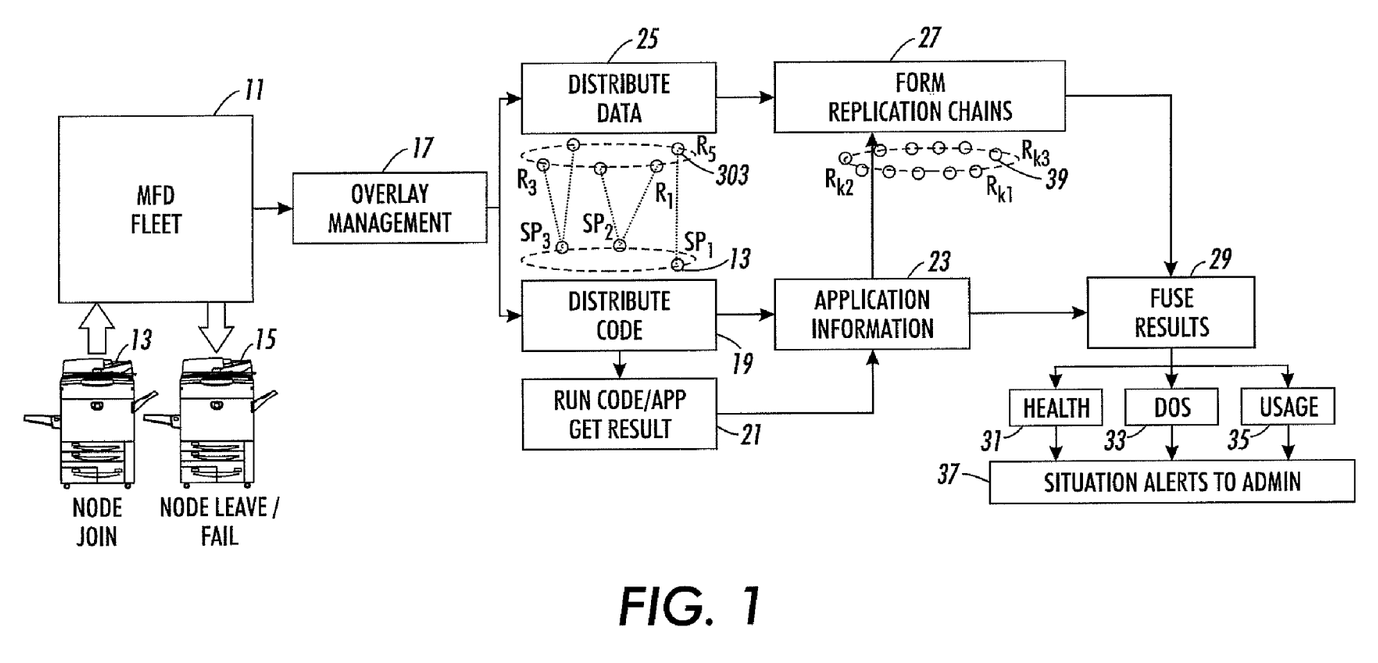
FIG. 1 illustrates the overall network in which the present disclosure may be implemented.

Referring now to the drawings wherein the showings are for purposes of illustrating the disclosed embodiments only and not for purposes of limiting the claimed subject matter. FIG. 1 provides an overall system into which the present disclosure may be implemented. The system includes a multifunction device fleet 11 including multifunction devices 13 and 15, whereas multifunction device 13 has joined the multifunction device fleet 11 that serves as a node and 15 has not. The system further includes an overlay management system 17 in communication with the distributed code 19, a run code application and result module 21 and application information 23. The system further includes a distribution module 25 and a replication module 27. The system further includes a result fusion module 29 in communication with a health monitor 31, a denial service monitor 33, and a usage monitor 35. These monitors are in communication with an alert module 37. The system also includes data replication chains 39. FIG. 1 shows but one embodiment into which the present disclosure may be implemented. This disclosure may include a variety of networks and still fit within the spirit of this disclosure.

This disclosure describes a serverless and decentralized overlay based mechanism for monitoring and detecting anomalies in an SOA. This SOA includes a combined set of services that the MDF fleet 11 can provide. The system is also serverless. In this sense, the MDF fleet 11 may internalize any resource need (such as computing and memory) without mandating additional special purpose hardware tasked with monitoring the fleet 11. This disclosure may be implemented in order to utilize a variety of monitoring scenarios including fleet health 31, usage monitoring 35 and the detection of malicious acts, such as DOS.

The technique described throughout this disclosure inherently addresses cost effectiveness and load balancing as it spreads the workload among multiple available and often underutilized MFDs 13, 15 in the fleet 11. The workload includes overhead due to fail-safe monitoring, e.g. messaging, analysis, reporting, data/code replication and self management.

The system includes n nodes (MFDs or servers 13, 15) in the SOA. A certain number of the nodes may be chosen in order to form the overlay management network 17. In some embodiments, all of the nodes are chosen. However, in other embodiments, they are chosen through election by an administrator, randomly, by a specific attribute, such as location or resource availability, by a policy, etc. These chosen nodes are generally referred to as super peers 13.

Figure 3:
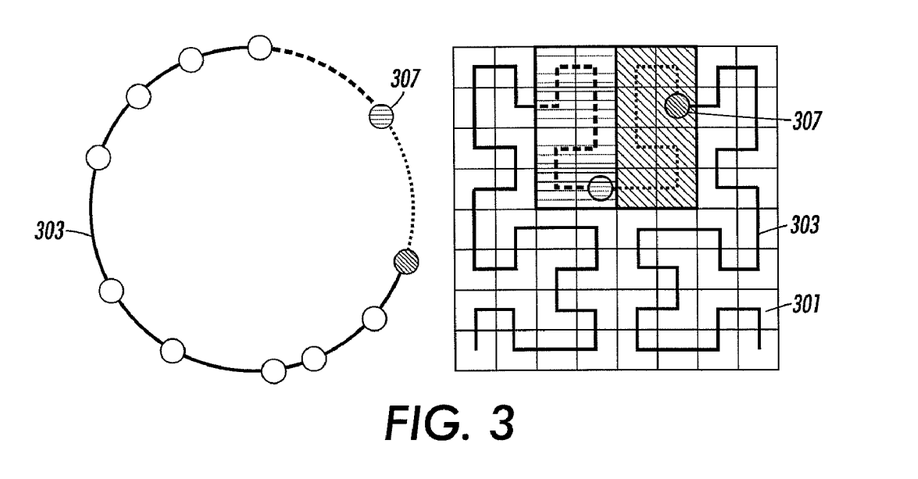
FIG. 3 illustrates a schematic for information partitioning and the mapping of the overlay network to the information space.

As a node or super peer 13 joins or leaves the decentralized overlay management system 17, the data is automatically distributed and the code is available for processing by other nodes 13 in the grid. It should be noted, however, that different applications require varying degrees of replication and because nodes 13 fail non-homogenously, application specific and failure sensitive replication occurs in the form of replication chains 303. This is generally monitored through a replication module 27. The super peers 13 log information/events from a multidimensional information space for the peers 13 or the region that they represent. The ring of super peers 13 facilitates bi-directional information flow so that in the event that one of the super peers 13 fails, another super peer 13 can take up the failed super peer's 13 role and redistribute information such as routing tables, key value pairs, etc. This information may be redistributed from adjacent super peers 13. Generally, the distribute module 19 will distribute the data 25 among the super peers 13. This network will allow for self-healing properties to be implemented via the overlay management network 17 formation.

To the extent that some super peers 13 may fail resulting in loss of computing and storage resources, the data loss may be handled by the peer-to-peer monitoring framework. This framework may be introduced by replication chains 39. Replication chains 39 are sensitive to the type of application that requests data 25 duplication. The run code application module 21 is configured to run the distributed code 19 through each of the super peers 13 and allow for the application-specific information to be specified via the application information module 23.

The replication module 27 is responsible for using the distributed data to form replication chains 39. The data may then be fused by results module 29. After collecting the distributed data 25 and mitigating the effects of failures, SPs/13, can each take a data region that is assigned to look up the dense areas relative to their surroundings and flag acceptable or abnormal behavior. This process may be performed from time to time through Distributed Density Based Clustering (DDBC) algorithms. The super peers 13 may communicate with each other to keep track of overall density and points received. This process is further detailed in FIG. 4 below.

When creating a replication chain 39, it is useful to remember that frequencies of system wide failures are lessened by moving data keys from failure prone nodes to nodes that are less likely to fail. Moreover, data itself can be replicated on a basis of utility to the application. For example, replicating data many times closer to the point of consumption may result in a high utility creating lower path lengths and lower delays. For this reason, instead of uniformly maintaining copies of each piece of data, the method may include choosing nodes where the data is stored on the basis of the nodes' failure probability. Furthermore, the number of times that a data point needs to be replicated may vary. Therefore, data replication should form a chain that is stored on multiple nodes that is a function of the nodes liability as well as the data's proximity to the application. Different application may parametrize their reliability needs and utility requirements as to create an application dependent replication chain 39. For example, a database application may require three good replications whereas a routing application may require as many replications as there are SPs/nodes. These data points will be stored in as many locations as needed and as close to the point of consumption as possible.

A Chord-like overlay protocol generally automatically keeps copies of the applications information when the nodes are added or deleted. This process is explained in further detail in "Clustering Analysis for the Management of Self-Monitoring Device Networks," A. Quiroz*, M. Parashar, N. Gnanasambandam and N. Sharma, *Proceedings of the 5th IEEE International Conference on Autonomic Computing (ICAC* 2008), Chicago, USA, IEEE Computer Society Press, June 2008 which is herein fully incorporated by reference. If a node fails, the application level query for data gets automatically rerouted to the failed node's successor on the overlay network. This ensures that additional messaging overhead is not incurred for finding a replacement for the failed node. It should be noted that data may still be exchanged and divided among the surviving nodes. In high failure network, code variances may be used to ensure that queries for the data will be retrieved from the closest living survivor.

Apart from self-healing properties, the application level overlay network provides a certain level of efficiency by keeping message traffic minimal. The application level overlay also ensures short average path lengths to data such as routing tables and/or other key-value pairs.

Any super peer 13 can provide an overall situational alert to an administrator (at step 37). The determination of what will signify an alert is detailed in FIG. 5.

Figure 2:
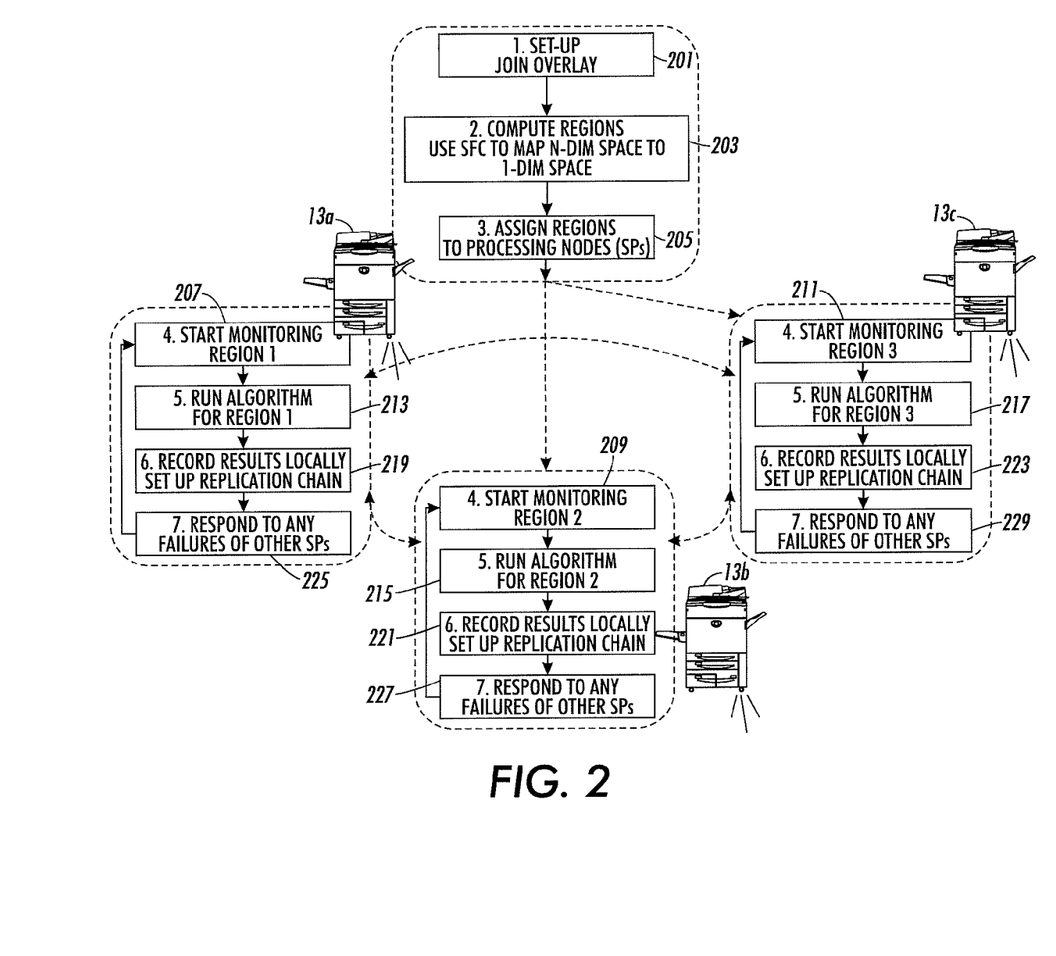
FIG. 2 illustrates a flow chart for the overlay based system including role sharing.

Now referring to FIG. 2 which shows a flow chart for the overall based system, including role sharing. The method begins (at step 201) with setting up the join overlay. The join overlay involves the overlay management system 17 being mapped upon the service architecture. This step facilitates in the distribution of the information space to a plurality of super peers 13.

The method continues (at step 203) with computing the regions used for the space filling curve 303 to map n dimension space to 1 dimension space. This step is drawn out in further detail below and illustrated in FIG. 3. This step uses the overlay network in order to establish mapping between the super peers 13 and the regions of information space 301, FIG. 3 that are routed to information on the network of super peers 13.

The method continues (at step 205) with assigning regions to the processing nodes, e.g. super peers 13. This step uses the fact that the space filling curve 303 is known to all super peers 13, to assign regions to nodes in a distributed fashion without explicit information exchange about the manner of region assignment. A replication chain 39 is then formed to distribute data throughout the MFD fleet 11 in a manner requested by the application. In one example, the super node may be used in order to create uniform distribution of points of information. This is detailed in FIG. 4 below.

The remaining steps of the method are generally done simultaneously for each region. FIG. 3 points to three separate super peers 13 performing these steps. However, it should be noted that there may be many super peers 13 that run a variety of applications. The steps should not be limited only three regions. It should also be noted that the first three initialization steps, step 201, 203 and 205 may be performed in any one of the super peers 13. The code to perform steps 203 and 205 could be shared by a super peer 13 after initial set up. This then enables the other members of the fleet 11 to gradually start participating in computing and assigning regions. However, the next four steps are generally performed in the node for that particular region.

The method continues (at step 207, 209, 211) with monitoring the respective region. Each node is generally responsible for monitoring the activity and applications in the region in which it was assigned. Each region may have a plurality of applications and these applications may have been replicated through a variety of the nodes.

The method continues (at step 213, 215, 217) with running an algorithm for region 1. In one embodiment the algorithm is the DDBC algorithm explained in further detail below and shown in FIG. 4. This is a clustering algorithm that may be set at each super peer 13A, 13B, 13C. However, other algorithms may be used in order to determine the status of health usage and the presence of an attack.

The method continues (at step 219, 221, 223) with recording results locally and setting up a replication chain 39. Through this step in the method, the data is transferred to the relevant super peers 13 in order to create a replication chain 39. Through the replication chain 39, the data and code is stored in the region and replication per the application's needs. In this sense the information that is stored locally in one super peer 13 will be available to the other relevant super peers on a per application basis. This forms a replication chain 39 that enables robust monitoring throughout the fleet 11 and not just locally.

The method concludes (at step 225, 227, 229) with responding to any failure of the super peers 13. In this form any super peer 13 that goes off line will have data that is backed up throughout the entire network. In this form, the algorithm selectively replicates its data on a percentage of the total number of super peers 13, depending on the attributes and failures in the network.

Now referring to FIG. 3, a schematic of the mapping overlay network to information spaces shown. From a monitoring perspective, the purpose of each super peer 13 in the overlay is to provide resources. These resources include computation resources for running the algorithm and storage resources for information from other peers. Every super peer 13 will asynchronously run a certain portion of the computation. This portion is obtained by dividing the information space 301 into non-overlapping regions using a space filling curve 303. FIG. 3 shows a one dimensional index space that results from mapping the space filling curve to an n-dimensional information space 301. These information spaces 301 are divided into data regions 305 where each super peer node 307 will dictate a certain portion of the information space 301. The total information space 301 is shared among all super peers available, forming a Chord-like ring overlay network.

FIG. 3 shows the overlay network with circles that represent the super peers 307. The super peers 307 are responsible for nodes belonging to the shaded portion. FIG. 3 also shows the information space 301 partitioned into several different regions using a space filling curve 303. The space filling curve is shown through the data regions 305 displaying that one or more regions 305 is assigned to a super peer 307. Furthermore, if one super peer 307 fails another super peer may take over those regions until the first super peer 307 recovers.

It should be noted that data regions 305 may be irregular hyper-volumes unlike spheres, ellipses, cubes, etc. The shape of the data regions may be further determined by units chosen along each dimension. For example, a linear unit versus a logarithmic unit will result in regions or hyper-volumes that may not have the same volumes all across the information space.

Figure 4:
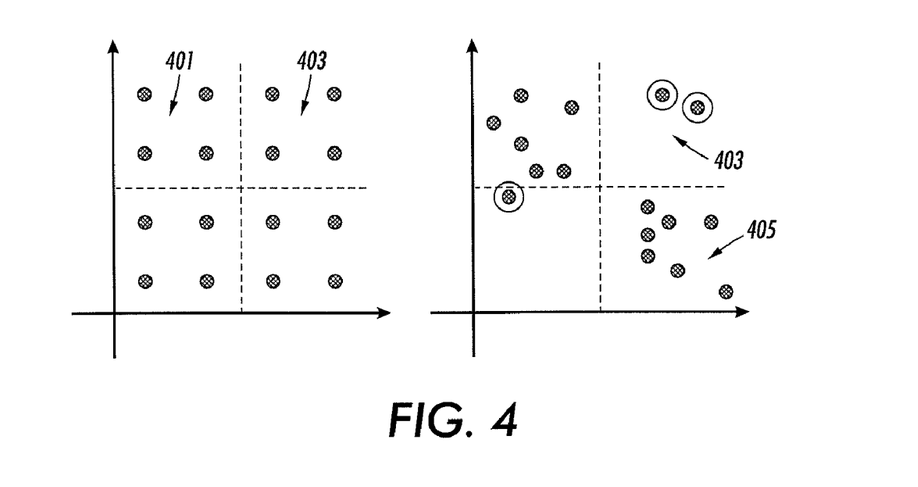
FIG. 4 illustrates distribution of information points in two dimensions.

Now referring to FIG. 4 where distribution of points in two dimensions is shown. This figure is a graphical representation of how algorithm DDBC operates on a finite discrete and normalized information space that is n dimensional. As previously stated, this space may divided into regions using the concept of a space filling curve 303, FIG. 3. These space filling curves 303 will assist in a super peer 13 being assigned to a unique region. The following is one embodiment of the algorithm being run, which may take place in each region, steps 213, 215, 217, FIG. 2. In the simplest embodiment we can assume that each super peer 13 is assigned one region. This, however, is not always the case and super peers may be assigned more than one region. This is simply shown for the purpose of this example. The algorithm DDBC may find the density of each region and delineate as anomalies clusters of points that are deviates from the normal for that region. The idea of uniformly-sized regions is displayed at 401. A high density region is shown at 405 and a low density region is shown at 403. Super peers 13 correspond to these regions and take action in conjunction with other super peers. The details of the DDBC algorithm are shown in Table 1.

TABLE 1

ANALYSIS (size (D), T)

| | |
|---|---|
| 1 | exp_count = size (R) * (side (D) / size (S)) |
| 2 | clusters ← { } |
| 3 | anomalies ← { } |
| 4 | listen for period T |
| 5 | points ← {p I p received during T} |
| 6 | count = size (points) |
| 7 | If count > exp_count |
| 8 |    w_cluster = width (points) * (2-density (points)) |
| 9 |    add (centroid (points), w_cluster) to clusters |
| 10 | Else |
| 11 |    anomalies ← points |
| 12 |    For each neighbor |
| 13 |      If neighbor.clusters != { } |
| 14 |        For each (centroid, w_cluster) |
| >> |          in neighbor.clusters |
| 15 |          For each a in anomalies st. |
| >> |            dist (a, centroid) <= w_cluster |
| 16 |            remove a from anomalies |
| END | |

This clustering algorithm may be used at each super peer 13. D corresponds to a data point set; T corresponds to the observation time period, size (.) corresponds to the cardinality operation. Exp-count corresponds to the expected count from the overall data point set and w-cluster stands for the cluster width.

Traditional clustering techniques such as distributed k-means and DBSCAN may require human intervention in setting parameters—for example, the number of clusters to detect. The present disclosure contains an implementation that requires lesser human intervention. While humans may exercise the option of setting the number of super peers 13 and the number of dimensions in the units, this data can be pre-configured and set as a default. The data may also be deduced dynamically after a few time periods as preferred by the end user. The number of super peers 13 could be set to encompass every node given that each node has some resources to spare.

Figure 5:
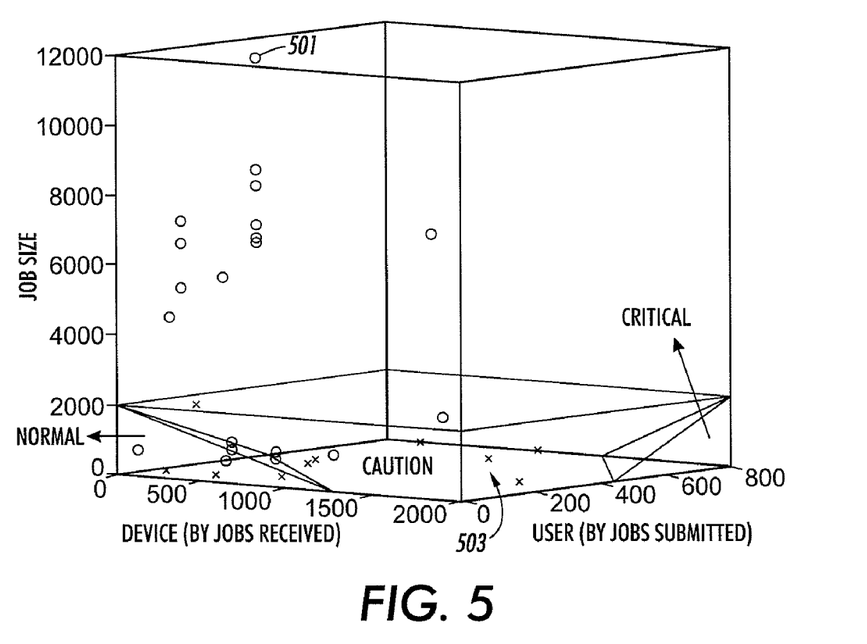
FIG. 5 is a graphical illustration of regions of operation in a multidimensional information space.

Now referring to FIG. 5, which shows a graphical illustration of regions of operation in a multidimensional information space. This graphical representation shows points with respect to three dimensions including the job size, the device by jobs received and the user by job submitted. This is but one example of three criteria that may be used in order to judge normal device usage. The points fall into four different regions which include the undetermined region 501, a caution region 503, a normal region 505 and a critical region 507. These results may be interpreted in order to specify when and how an end user should be alerted with respect to the health of the network. Anomalies may correspond to an abnormal job size or abnormal pairs of users and devices. These may suggest network intrusions or other undesirable scenarios. The criteria for these different regions may change statically or dynamically as dictated by the system.

The above description merely provides a disclosure of the particularly embodiments of the invention which is not intended for purposes of limiting the same thereto. As such, the invention is not limited to only the above described embodiments, rather it is recognized that one skilled in the art could conceive alternative embodiments that fall within the scope of the invention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for implementing a decentralized serverless fail-safe monitoring application in a peer-to-peer manner comprising:

selecting a number of nodes to form an overlay network;
   dividing an information space;
   mapping a number of data regions of said divided information space by assigning each one selected node to at least one non-overlapping data region related to its surroundings;
   forming at least one replication chain for distributing to at least one neighboring select node information from said at least one non-overlapping data region assigned to said one select node, wherein a degree of replication for said replication chain is application specific;
   monitoring by said one select node a distribution of said non-overlapping data region assigned to said one select node; and
   rerouting a query of data to said neighboring node if said selected node fails; and,
   selectively replicating data of said failed node by said neighboring node on a percentage a total number of nodes of said divided information space.

2. The method according to claim 1, wherein mapping includes forming a replication chain configured to spread across overlay nodes suited for a particular application.

3. The method according to claim 1, wherein distributing said data regions includes computing regions in order to utilize a space filing curve configured to facilitate uniform distribution.

4. The method according to claim 3, wherein said space filling curve is configured to fill an n-dimension information space.

5. The method according to claim 1, wherein said nodes are multifunction devices.

6. The method according to claim 1, wherein said information identifies system attacks.

7. The method according to claim 1, where said information identifies usage.

8. The method according to claim 1, where said information identifies health.

9. The method according to claim 1, wherein monitoring said data in said data regions includes processing a distributed density based clustering algorithm configured to identify a non-uniform distribution in said data regions.

10. The method according to claim 1, wherein the rerouting comprises implementing self corrective action.

11. The method according to claim 1, wherein the rerouting comprises communicating said non-uniform distribution to a system administrator.

12. The method according to claim 1, further comprising recording results of the information locally in each said node.

13. A service oriented architecture for a workload distribution mechanism including one or more processing nodes comprising:

a memory;
   an information space divisible into at least one data region;
   a plurality of servers comprising a plurality of super peers, each one super peer configured to monitor distribution in at least one corresponding data region;
   a replication chain configured to create a monitoring overlay framework that facilities peer-to-peer bi-directional communication by distributing information in said at least one data region to at least one said super peer, the replication chain distributes to said super peer information of at least one non-overlapping data region assigned to a failed peer, wherein a degree of replication of said replication chain is application specific;

data of said failed super peer is selectively replicated by said super peer on a percentage of a total number of super peers monitoring said information space; and an interface configured to communicate information collected by said at least one super peer to an administrator.

14. The architecture according to claim 13, wherein said plurality of servers are configured to respond to said information that signifies an anomaly in said architecture.

15. The architecture according to claim 13, wherein said plurality of servers includes multifunction devices.

16. The architecture according to claim 13, wherein said plurality of servers includes PDAs.

17. A serverless distributed monitoring and anomaly defection architecture comprising at least one processing node including:

a replication module adapted to create multiple instance of data regions for distribution among nodes;

a distribution module adapted to distribute said data regions;

a monitoring module configured to collect and analyze distribution in said data regions and identify anomalies in said node functionality;

an alarm configured to communicate said anomalies to an administrator; and an overlay management system that is in communication with said replication module, said distribution module, said monitoring module and said alarm and is configured to facilitate a degree of data replication based on an application need basis, wherein data of a node having identified anomalies is selectively replicated by a neighboring node on a percentage of a total number of nodes monitoring said multiple data regions.

18. The architecture according to claim 17, wherein said distribution module includes implementing space filling curves configured to facilitate proper data region distribution.

19. The architecture according to claim 17, wherein nodes comprises a plurality of multifunction devices.

20. The architecture according to claim 17, wherein each said node is configured to asynchronously run a data region or group of data regions, where said data regions are grouped into non-overlapping regions using a space filling curve.

* * * * *